United States Patent [19]

May et al.

[11] Patent Number: 5,087,918
[45] Date of Patent: Feb. 11, 1992

[54] FMCW/2FD IMPLEMENTATION FOR VEHICLE NEAR OBSTACLE DETECTION SYSTEM

[75] Inventors: Phillip A. May, Lompoc, Calif.; John L. Ward, Kokomo, Ind.; Kassahun Kebede, Philadelphia, Pa.

[73] Assignee: Delco Electronics Corporation, Kokomo, Ind.

[21] Appl. No.: 503,435

[22] Filed: Apr. 2, 1990

[51] Int. Cl.$^5$ ............................................... G01S 13/38
[52] U.S. Cl. .................................. 342/85; 342/130; 342/70; 340/435
[58] Field of Search .............. 342/85, 70, 82, 130; 340/932.2, 435, 436, 437

[56] References Cited

U.S. PATENT DOCUMENTS

| | | | |
|---|---|---|---|
| 3,068,471 | 12/1962 | Erst | 342/130 |
| 3,120,659 | 2/1964 | Wells et al. | 342/130 |
| 3,216,010 | 4/1965 | Roeschke | 342/85 |
| 3,611,370 | 10/1971 | Frasure et al. | 342/92 |
| 3,864,678 | 2/1975 | Yamanaka et al. | 342/59 |
| 3,898,655 | 8/1975 | Tresselt | 342/83 |
| 4,349,823 | 9/1982 | Tagami et al. | 342/70 |
| 4,673,937 | 6/1987 | Davis | 342/72 |
| 4,694,295 | 9/1987 | Miller et al. | 340/903 |
| 4,893,125 | 1/1990 | May | 342/129 |
| 4,901,083 | 2/1990 | May et al. | 342/128 |

Primary Examiner—John B. Sotomayor
Attorney, Agent, or Firm—Howard N. Conkey

[57] ABSTRACT

A vehicle near obstacle detection system includes a plurality of radio frequency heads that can transmit and receive both frequency-modulated, continuous wave and two-frequency Doppler radar signals, such that the system operates in frequency-modulated, continuous wave radar mode and in two-frequency Doppler radar mode. The radio frequency heads used for transmitting the radar signals transmit their radar signals in accordance with commands from a system controller. The radio frequency heads are provided at various locations on the vehicle, directed at points around the vehicle which cannot easily be seen by the vehicle operator. The system controller switches between the two radar modes depending on which one is more appropriate to make use of one mode's strengths while avoiding the other mode's weaknesses. When there is no relative movement between objects and the vehicle, the frequency-modulated, continuous wave mode is used. When there is relative movement and the accuracy warrants it, the two-frequency Doppler mode is used.

6 Claims, 2 Drawing Sheets

FMCW/2FD IMPLEMENTATION FOR VEHICLE NEAR OBSTACLE DETECTION SYSTEM

BACKGROUND OF THE INVENTION

1. Field of the Invention

This invention relates generally to vehicle near obstacle detection systems and, more particularly, to vehicle near obstacle detection systems that provide high target range resolution, detection of both stationary and moving objects, and resolution of multiple targets.

2. Description of the Related Art

A frequency modulated, continuous wave (FMCW) radar system is capable of detecting objects even in the absence of relative motion between the object and the system, and can provide a measure of the range to the object even at very close distances. Furthermore, an FMCW system can detect multiple objects and indicate their ranges. Finally, an FMCW system can operate under virtually all environmental conditions. These qualities make an FMCW system desirable for vehicle near obstacle detection systems. Unfortunately, most present FMCW systems require a relatively large radio frequency (RF) bandwidth to detect objects with any great resolution. Government allocation of RF frequencies constrains the bandwidth available for vehicle near obstacle detection systems, and therefore limits the maximum resolution of such systems.

A two-frequency Doppler (2FD) radar system is capable of providing very accurate range and velocity information for an object. This makes the 2FD system desirable for vehicle near obstacle detection systems. Unfortunately, a Doppler system requires relative motion between the system and the object, and therefore is unable to detect objects that are not moving relative to the system. That is, a 2FD system cannot detect objects in the absence of relative motion. A 2FD system also cannot distinguish between multiple objects. Finally, a 2FD system also incorporates the phenomenon of repeat nodes, whereby range to an object can be accurately determined only within a given interval up to a repeat node distance, and thereafter can only be determined as being located within multiples of that distance. For example, if a 2FD system repeat node occurs at 20 feet, the system might not be able to distinguish between an object at 20 feet, 4 inches and an object at 40 feet, 4 inches. Because of the need for relative motion, the system will be unable to provide information each time the vehicle comes to a stop, and for a time thereafter as the system regains information.

From the discussion above, it should be apparent that there is a need for a vehicle near obstacle detection system that provides the accuracy, multiple object, environmental, and stationary obstacle benefits of an FMCW system and the accurate range and velocity benefits of a 2FD system, without being constrained to one system or the other and without being subject to the drawbacks of the particular system. The present invention satisfies this need.

SUMMARY OF THE INVENTION

The present invention provides a vehicle near obstacle detection system that combines both a frequency modulated, continuous wave (FMCW) system and a two-frequency Doppler (2FD) system, and operates by transmitting either FMCW signals or 2FD signals, switching between the two depending on the detected objects and their ranges so as to use the optimal system. The FMCW part of the detection system provides for the detection of both stationary and moving objects, and is capable of multiple object resolution. The 2FD part of the detection system provides very high resolution range and velocity information at close ranges A vehicle near obstacle detection system in accordance with the present invention includes multiple radio frequency (RF) heads that transmit and receive radar signals of either the FMCW or 2FD type. The RF heads are strategically placed around the vehicle, in accordance with particular zones of interest. For example, the system is provided with rearward facing heads, and with one head on each side of the vehicle directed rearward at the driver's blind spots, and also with forward facing heads directed at the area in front of the vehicle but below the driver's line of vision. The system also provides three operating modes, to make optimum use of the RF head placement depending on the driving circumstances. A front detection mode makes use of the forward facing RF heads and is used when driving the vehicle forward. A blind spot mode makes use of the two side RF heads and alerts the vehicle driver to obstacles in the blind spots. A rear detection mode makes use of the rear RF heads and is used when backing the vehicle. The system operates under control of an on-board computer, which can automatically switch between modes, and which also responds to driver commands.

The system's front detection mode is intended primarily for circumstances where the vehicle is being driven forward at a relatively low speed. The blind spot mode is intended primarily for use at relatively great forward speeds and during lane change maneuvers. Finally, the rear detection mode is intended primarily for use when the vehicle is being driven in reverse. Under all of the modes, detection of an obstacle is signalled by a visual indicator and an audible indicator. The visual indicator is preferably a flashing light whose frequency of flashing can be made to correspond to the range to the object, with the frequency increasing as the range decreases. The audible indicator is preferably a buzzer or similar tone. The buzzer or tone emits its sound in time with the flashing light. In the case of multiple objects, the indicators are made to operate with respect to the nearest detected object.

The present invention provides the benefits of both FMCW systems and 2FD systems, without being limited to one or the other and therefore without being limited by the shortcomings of either. For example, accurate range information when backing up the vehicle is provided by the 2FD subsystem. However, before the vehicle is moved in reverse, when there is no relative movement, range information is provided by the FMCW subsystem. For example, it is advantageous to begin backing a vehicle with the near obstacle detection system operating in the Doppler mode, to determine how close objects are to the vehicle, then it is desirable to switch into the FMCW mode for its abilities for greater distances and multiple object detection, and then possibly switch back to Doppler mode as the vehicle is backed further and objects become nearer. In accordance with the present invention, a vehicle near obstacle detection system is provided that provides such switching between radar subsystems. The combination of the two types of radar in a single vehicle near obstacle detection system provides for safer operation under virtually all of the driving circumstances typically encountered.

Other features and advantages of the present invention should be apparent from the following description of the preferred embodiment, which illustrates, by way of example, the principles of the invention.

DESCRIPTION OF THE PREFERRED EMBODIMENT

The following description of the present invention is not to be taken in a limiting sense, but is made merely for the purpose of illustrating the general principles of the invention. The following detailed description is of the best presently contemplated mode of carrying out the present invention.

Figure 1:
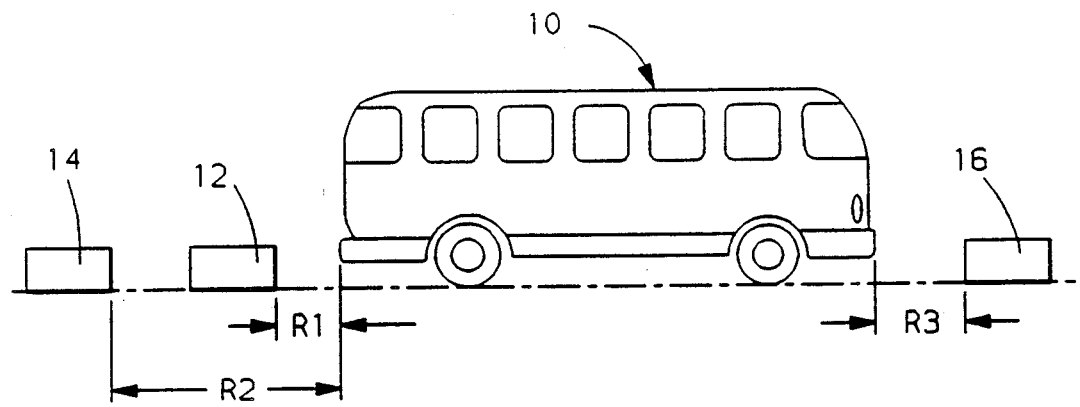
FIG. 1 is a right side elevational view of a vehicle equipped with a near obstacle detection system in accordance with the present invention.

A vehicle 10 with a near obstacle detection system in accordance with the present invention is illustrated in FIG. 1. The vehicle is shown with respect to a first object 12 located at a range R1 to the rear, a second object 14 located at a range R2 a further distance to the rear, and a third object 16 located at a range of R3 to the front. Under normal driving conditions, it would be very difficult for the vehicle operator to see any of these objects, as the rear object 12 is directly behind the vehicle 10 and cannot be seen with the side mirrors, the object 14 is in the operator's blind spot to the rear and side, and the front object 16 is below the operator's forward line of sight. A near obstacle detection system in accordance with the present invention, for example, provides the operator with an indication that the first object is located a range R1 behind and that the object 16 is located a range R3 in front, even with the vehicle and objects completely motionless. Once the vehicle or the objects or both begin to move, the system provides the vehicle operator with an indication of both the changing range to these objects and their relative speeds.

Figure 2:
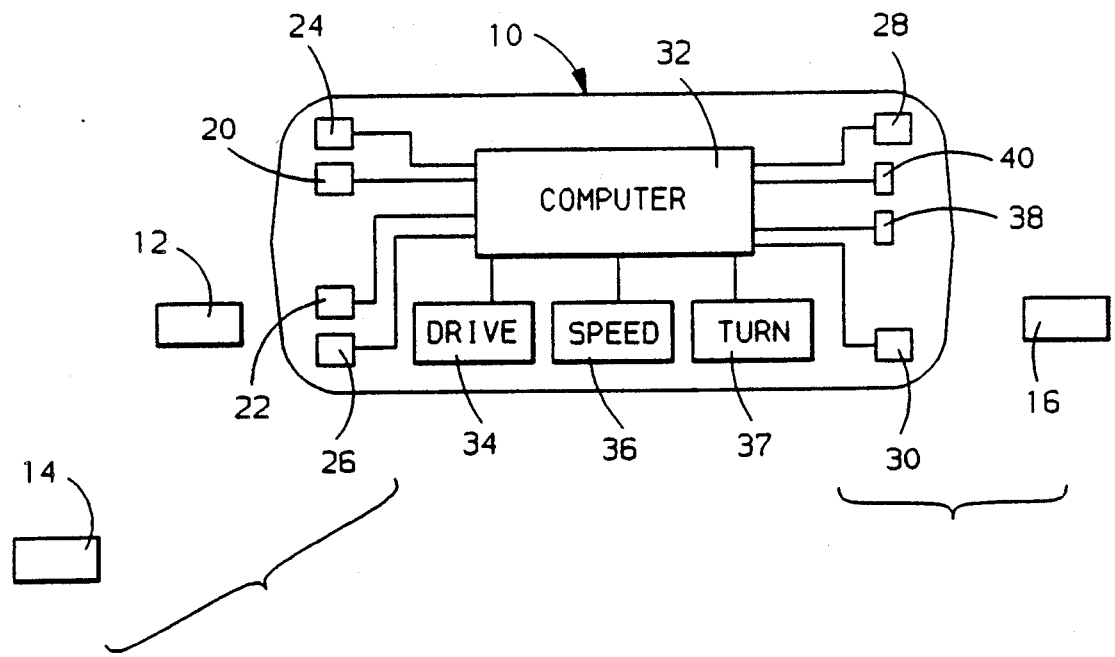
FIG. 2 is a simplified block diagram of a vehicle near obstacle detection system in accordance with the present invention.

FIG. 2 shows the vehicle 10 and some of the near obstacle detection system elements. The system includes six radio frequency (RF) heads that transmit and receive radar signals of both the frequency-modulated, continuous wave (FMCW) type and the two-frequency Doppler (2FD) type. The six RF heads are placed at various locations around the vehicle, in accordance with particular zones of interest. In particular, there are two rearwardly facing RF heads 20 and 22, one head 24 at the left rear and the one head 26 at the right rear directed at the rear side areas known as the blind spots of the vehicle operator, and two forwardly facing heads 28 and 30 directed at forward areas below the operator's line of sight. A central radar system computer 32 controls the transmission of the radar signals from the RF heads 20-30.

Regardless of whether a particular RF head 20-30 is transmitting a 2FD signal or an FMCW signal, when the signal is reflected by an object back to the RF head, the reflected signal is provided to the system computer 32, which can then perform the appropriate processing to determine the range and speed of the object. The system computer is also provided with an indication of whether the vehicle 10 is moving in a forward direction or reverse direction by a transmission indicator 34, and is provided with an indication of the vehicle speed by a vehicle speed indicator 36, such as the vehicle speedometer. The system computer controls the type of radar transmission from each RF head based upon the range and speed information obtained from the reflected signals and based upon the vehicle speed and direction, as described below.

The near obstacle detection system of the vehicle 10 operates in one of three modes. A front detection mode utilizes the two forward facing RF heads 28 and 30 to alert the vehicle operator to objects in front of the vehicle but below the operator's field of vision. If desired, the front detection mode can be disengaged when the vehicle is not being parked or being driven away from a parked position, to avoid false indications from rocks, pot holes, and the like in the roadway. A blind spot mode utilizes the two side rear RF heads 24 and 26 and alerts the vehicle operator to the presence of an object in either blind spot to the side and rear of the vehicle. A rear detection mode utilizes the two rear facing RF heads 20 and 22, and warns of objects directly behind the vehicle. As the vehicle operator switches between forward and reverse drive gears, the system computer 32 automatically switches between the various operating modes. The vehicle operator can also command the system computer to engage or disengage any particular mode and remain there.

In automatically selecting between the three operating modes, the system computer 32 responds to the vehicle speed and the direction of vehicle travel. For example, with the vehicle in a forward gear, if the vehicle speed is a moderate amount, such as below eight miles per hour, the system computer selects the front detection mode to alert the vehicle operator to objects below the operator's field of vision. After the vehicle forward speed increases, for example to above eight miles per hour, and a turn indicator 37 indicates that one of the vehicle's turn signals has been activated, the system computer selects the blind spot mode to alert the operator of traffic alongside the vehicle. This is especially helpful when making lane changes or merging into traffic. Finally, when placed in reverse, the system computer selects the rear detection mode to warn of objects directly behind the vehicle.

In addition to automatically selecting between operating modes, the system computer 32 also responds to detected object range and speed information to control the type of radar signals transmitted by the RF heads 20-30. For example, in the front detection mode, the system will initially transmit FMCW signals because it can thereby detect multiple objects and can detect them even in the absence of relative motion. If only a single object is detected at less than a predetermined distance, the system computer quickly switches to 2FD signals, for greater accuracy. If multiple objects are detected, or no objects closer than a relatively great distance are detected, the system remains in FMCW operation. Similarly, when the vehicle is first placed in reverse, the system computer selects the rear detection mode, transmitting FMCW signals. If an object is located at less than a predetermined distance, the computer selects 2FD signals, and remains in FMCW if the nearest cf multiple objects is farther than a predetermined distance. The predetermined distance is selected in accordance with the particular radar frequencies being used. In the illustrated system, where the 2FD signals are centered about 10.5 GHz and the FMCW signals are centered about 24.125 GHz, the predetermined distance is approximately five feet, as described more fully below.

Regardless of the transmitted signal type or the operating mode of the obstacle detection system, a visual indicator 38 and an audible indicator 40 located in the vehicle interior signal the presence of a detected object. In the illustrated vehicle 10, the visual indicator is a flashing light mounted on the vehicle dashboard, or driver control panel (not illustrated), while the audible indicator is a buzzer. Both indicators are activated by the system computer 32. The blinking of the flashing light and the sounding of the buzzer can both be made to vary with the detected object's range, increasing in frequency as the range decreases. The combination of visual and audible indicators allows the operator to be alerted even if the operator is not looking in the direction of the object or even if the operator is not looking out of the vehicle cabin. In this way, even an inattentive operator should be warned with sufficient time to take corrective actions to avoid objects.

It is to be understood that many different types of visual and audible indicators can be provided. For example, the pitch of the audible indicator can be made to vary with range. If desired, a numerical indication of object range and speed can also be provided, such as a bar graph, moving tape, or digital number display.

Figure 3:
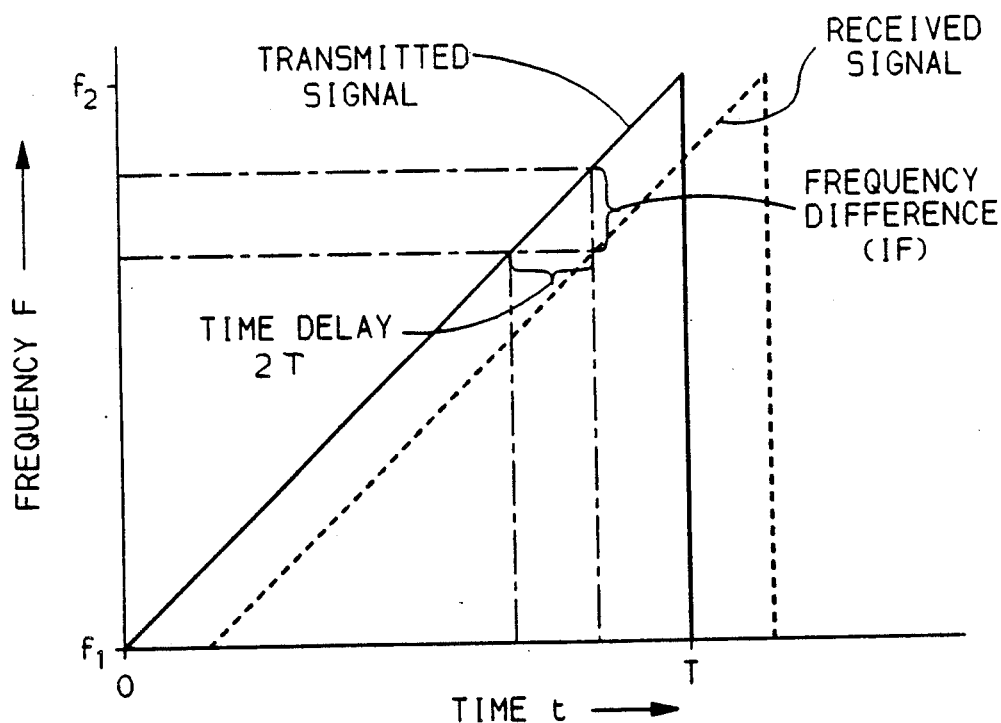
FIG. 3 is a diagram of the transmitted and received RF signals from the FMCW radar subsystem of the vehicle illustrated in FIG. 1.

By combining both FMCW and 2FD systems, an obstacle detection system in accordance with the present invention can provide the benefits of each type of radar system without being constrained by each system's limitations. FIG. 3 illustrates the basic operating principles behind the FMCW system. An RF signal is transmitted at a steadily increasing frequency in accordance with a sawtooth pattern. That is, the frequency of the transmitted signal increases linearly with time, as indicated by the solid line in FIG. 3. Thus, the frequency of the transmitted signal changes from a frequency f1 to a frequency f2 in a time period T. The radar signal is transmitted from one of the RF heads, reflects off an object, and returns to the RF head after an interval corresponding to the round trip time of the signal. The reflected signal is represented in FIG. 3 by the dotted line, which is shifted in time from the transmitted signal by the round trip time.

Because the FMCW transmitted signal is modulated over time, and the reflected signal is delayed from the transmitted signal, there is a frequency deviation between the two signals at any instant in time. A system mixer mixes together the transmitted signal and the reflected signal to produce an intermediate-frequency (IF) signal having a frequency equal to the difference in frequency between the two signals. The greater the range is from the system to an object, the greater is the difference frequency. Thus, the variation in range corresponds to a variation in frequency. This frequency variation is present whether or not there is relative movement between the system and the object. For a moving object, there is a slight frequency shift, but the effect is negligible. Further, two different objects at two different ranges will produce two different frequencies in the reflected signal. Again, the farther the range to an object, the greater the difference frequency. Therefore, in the case of multiple reflected frequencies, the lowest frequency corresponds to the closer object. Thus, the FMCW system can provide an indication of target range even if there is no relative movement and can indicate the range to each of multiple objects.

Unfortunately, the radio frequency band available for the FMCW system is limited by government regulations and practical considerations such that the frequency difference between f1 and f2 is a band of 200 MHz. The time to sweep from f1 to f2 in FIG. 3 is approximately 1 msec in this example. That is, the IF signal is sampled during ramp intervals of 1 msec. This provides a resolution of the IF signal in increments of 1 kHz, meaning that IF frequencies can be identified within 1 kHz. For the frequencies in the illustrated detection system, 1 kHz corresponds to a range of approximately 2.5 feet. A 2 kHz IF frequency corresponds to an object at approximately 5 feet, 4 kHz corresponds to 10 feet, and so on. Therefore, an object cannot be distinguished from others using the FMCW signals within a distance of approximately 2.5 feet. Thus, the system can be characterized as having 2.5 foot-wide range bins, and to be distinguished by the FMCW system, different objects cannot be within the same range bin. Thus, the FMCW system provides a range accuracy of only approximately 2.5 feet, and the FMCW system, while providing a range indication even in the absence of relative movement and while detecting multiple objects, provides only a coarse range measurement.

Figure 4:
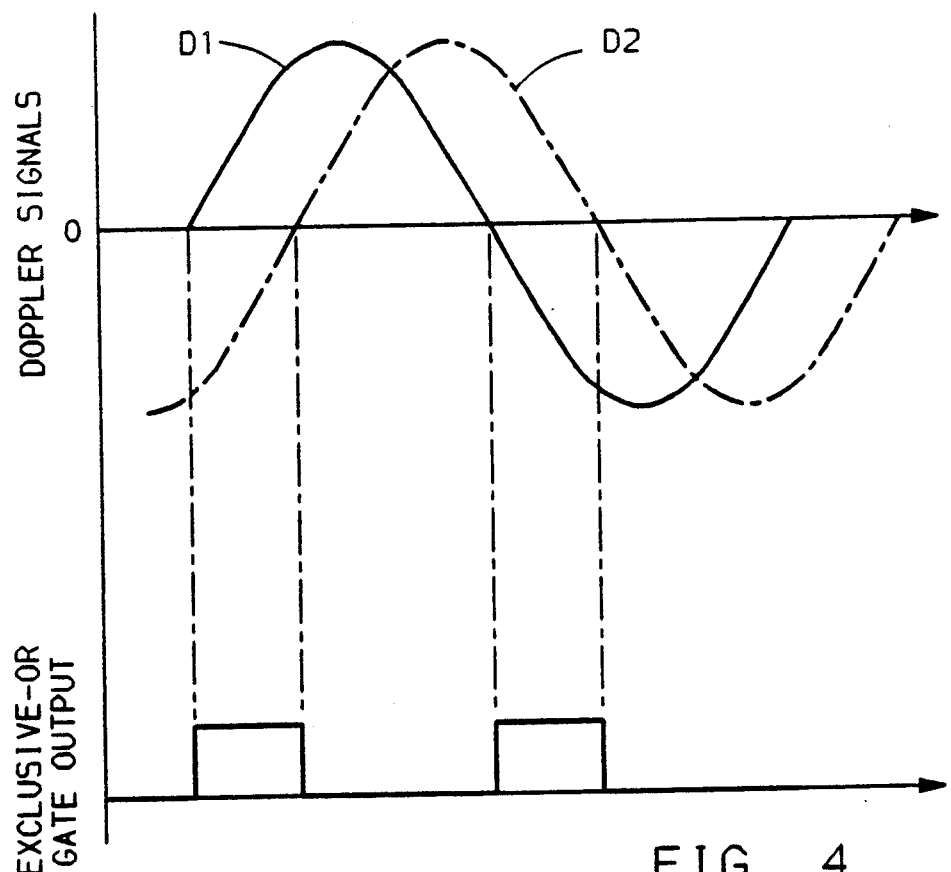
FIG. 4 is a diagram of various waveforms of the 2FD radar subsystem of the vehicle illustrated in FIG. 1.

A 2FD system can provide greater accuracy. FIG. 4 illustrates the basic operating principles behind a 2FD system. In a 2FD system, two continuous wave radar signals of slightly different frequencies are alternatingly transmitted, or multiplexed, at a rate faster than the highest expected Doppler frequency, and are reflected off an object. Each reflected signal is mixed with the corresponding transmitted signal to produce an intermediate-frequency (IF) signal, also referred to as a Doppler signal, resulting from relative movement between the vehicle and the object. Those skilled in the art will appreciate that, due to the small difference in wavelength between the two transmitted frequencies, the two Doppler signals will be shifted in phase from one another by an amount that is a measure of the distance from the vehicle to the object.

For example, a first Doppler signal D1 having a first frequency is identified in FIG. 4 as a solid curved line, while a second Doppler frequency signal D2 having a second frequency different from the first is identified as a dotted line. The phase difference between the two respective Doppler signals D1 and D2 is a measure of the range from the system to the object. The greater the distance from the system to the object, the greater the phase difference. In practice, the phase difference is proportional to the RF frequency difference. In the illustrated system, for example, the Doppler frequencies are centered about 10.5 GHz, only 3 MHz apart. This corresponds to a frequency range of 0.03%. Because the two Doppler frequencies are only slightly different, a 2FD system does not require a great bandwidth.

For an object 12 located a range R1 from the vehicle 10, the Doppler signals are provided to the system computer 32 for processing. As known to those skilled in the art, the two Doppler signals can then be demultiplexed and converted to two square waves, which can then be provided to an exclusive-OR gate (not illustrated). The output of the exclusive-OR gate is a signal having pulses that are high during non-overlapping periods of the Doppler signals, as illustrated in FIG. 4. Therefore, the duration of each pulse of the exclusive-OR gate signal represents the phase shift between the Doppler signals with respect to one-half the period of the Doppler signals. Thus, the exclusive-OR gate output is a signal whose duty cycle is a direct measure of the distance between the vehicle and the object. The range to the object can be measured by the 2FD system as long as the phase shift between the Doppler signals can be measured. In a 2FD system, the Doppler signals are cyclic and therefore the phase shift will repeat for each half of the Doppler signals, or at multiples of 180°. At the frequencies of the illustrated system, the repetition of the phase shift occurs at a distance to the object on the order of 25 meters. As known to those skilled in the art, this establishes the repeat nodes of the system.

The system computer 32 switches out of 2FD operation if the range to the object is greater than 5feet, so that multiple objects may be distinguished and stationary objects may be identified, because the fine range resolution of 2FD mode is primarily needed only at relatively short ranges. At these very short ranges multiple objects are not a significant problem, due to the fact that the power of the signal reflected by an object varies inversely with the range to the object raised to the fourth power. For example, where two objects are located at 2 feet and at 4 feet, respectively, the power from the closer object will be 16 times greater than that of the farther object. Therefore, even though the Doppler signals are composite signals including reflected signal components from all objects, the effect of the closer object will dominate even if the farther object is noticeably larger. Thus, the 2FD system is used for relatively close objects. Furthermore, the 2FD system requires that there be relative movement between the system and the object.

This discussion shows that the FMCW and 2FD systems each have their strengths and weaknesses. A vehicle near obstacle detection system in accordance with the present invention allows the strengths of each system to be exploited, without being saddled with the weaknesses of either. Thus, the close-in accuracy of 2FD is used to advantage, as is the stationary object detection and multiple object detection of FMCW. The accuracy of the 2FD system alleviates the resolution problem of the FMCW system, and the stationary detection capability of the FMCW makes up for the relative movement required by the 2FD.

While the present invention has been described with respect to a preferred embodiment, it is to be understood that variations may occur to those skilled in the art. Combinations of RF heads and strategies for switching between the operating modes and signal types other than those described, for example, can be used without departing from the teachings of the present invention. The invention, therefore, should not be seen as limited to the particular apparatus described herein, but it should be understood that the present invention has wide applicability with respect to vehicle near obstacle detection systems of different configurations. Such alternate configurations may be achieved by those skilled in the art in view of the description herein.

We claim:

1. A vehicle near obstacle detection system, the system comprising:

a radio frequency head capable of transmitting and receiving both frequency-modulated, continuous wave radar signals and two-frequency Doppler radar signals;

signal processing means responsive to received radar signals reflected from an object for determining the range to the object;

means for sensing vehicle speed; and means for controlling the radio frequency head to (A) transmit frequency-modulated, continuous wave radar signals when the sensed vehicle speed is zero and (B) transmit two-frequency Doppler radar signals when at least the sensed vehicle speed is greater than zero.

2. A vehicle near obstacle detection system, the system comprising:

a radio frequency head capable of transmitting and receiving both frequency-modulated, continuous wave radar signals and two-frequency Doppler radar signals;

signal processing means responsive to received radar signals reflected from an object for determining the range to the object; and means for controlling the radio frequency head to (A) transmit frequency-modulated, continuous wave radar signals when the determined range is greater than a predetermined distance and (B) transmit two-frequency Doppler radar signals when the range is less than the predetermined distance.

3. A vehicle near obstacle detection system, the system comprising:

a radio frequency head capable of transmitting and receiving both frequency-modulated, continuous wave radar signals and two-frequency Doppler radar signals;

signal processing means responsive to received a radar signals reflected from at least one object for determining the range to a nearest object when two-frequency Doppler radar signals are transmitted and for determining the ranges to multiple objects when frequency-modulated, continuous wave radar signals are transmitted;

means for sensing vehicle speed; and means for controlling the radio frequency head to (A) transmit frequency-modulated, continuous wave radar signals in response to predetermined conditions including (1) the sensed vehicle speed is zero, (2) the determined range to the nearest object is greater than a predetermined distance and (3) radar signals are reflected from multiple objects while the radio frequency head is controlled to transmit frequency-modulated, continuous wave radar signals and (B) transmit two-frequency Doppler radar signals otherwise.

4. A method of detecting obstacles in proximity to a vehicle having a radio frequency head capable of transmitting and receiving both frequency-modulated, continuous wave radar signals and two-frequency Doppler radar signals, the method comprising the steps of:

determining the range to an object from received radar signals reflected from the object;

sensing vehicle speed; and controlling the radio frequency head to (A) transmit frequency-modulated, continuous wave radar signals when the sensed vehicle speed is zero and (B) transmit two-frequency Doppler radar signals when at least the sensed vehicle speed is greater than zero.

5. A method of detecting obstacles in proximity to a vehicle having a radio frequency head capable of transmitting and receiving both frequency-modulated, continuous wave radar signals and two-frequency Doppler radar signals, the method comprising the steps of:

determining the range to an object from received radar signals reflected from the object; and controlling the radio frequency head to (A) transmit frequency-modulated, continuous wave radar signals when the determined range is greater than a predetermined distance and (B) transmit two-frequency Doppler radar signals when the range is less than the predetermined distance.

6. A method of detecting obstacles in proximity to a vehicle having a radio frequency head capable of transmitting and receiving both frequency-modulated, continuous wave radar signals and two-frequency Doppler radar signals, the method comprising the steps of:

determining the range to a nearest object from received radar signals reflected from the nearest object when two-frequency Doppler radar signals are transmitted;

determining the ranges to each object from received radar signals reflected from at least one object when frequency-modulated, continuous wave radar signals are transmitted;

sensing vehicle speed; and controlling the radio frequency head to (A) transmit frequency-modulated, continuous wave radar signals in response to any one of predetermined conditions including (1) the sensed vehicle speed is zero, (2) the determined range to the nearest object is greater than a predetermined distance and (3) radar signals are received reflected from multiple objects while the radio frequency head is controlled to transmit frequency-modulated, continuous wave radar signals and (B) transmit two-frequency Doppler radar signals otherwise.

* * * * *